United States Patent
Stephens

(10) Patent No.: US 6,981,735 B1
(45) Date of Patent: Jan. 3, 2006

(54) APPARATUS FOR INTERIOR AUTO COMFORT PADS

(76) Inventor: Aaron Stephens, 5632 Noble St., Golden, CO (US) 80403

( * ) Notice: Subject to any disclaimer, the term of this patent is extended or adjusted under 35 U.S.C. 154(b) by 0 days.

(21) Appl. No.: 11/074,211

(22) Filed: Mar. 8, 2005

(51) Int. Cl.
*B60J 7/00* (2006.01)
(52) U.S. Cl. .................. 296/153; 297/411.21; 248/118
(58) Field of Classification Search ................ 296/153; 297/411.21, 411.2, 411.3, 411.32, 411.46; 248/118, 188.1; D12/421
See application file for complete search history.

(56) References Cited

U.S. PATENT DOCUMENTS

| | | | |
|---|---|---|---|
| 4,910,060 A | 3/1990 | Nakanishi | |
| 4,982,921 A | 1/1991 | Sanders | |
| 5,332,288 A | 7/1994 | Coates | |
| 5,445,858 A | 8/1995 | Nwoko | |
| 5,713,544 A | 2/1998 | Wolf | |
| 5,893,601 A | 4/1999 | Carlberg | |
| 5,979,987 A | 11/1999 | Rich | |
| D419,130 S | 1/2000 | Dyment | |
| 6,093,468 A | 7/2000 | Toms | |

*Primary Examiner*—Joseph D. Pape

(57) ABSTRACT

An auto comfort pad to be utilized in various applications, such as, pad for a center console in a vehicle, armrest, and leg pad for a side door. The comfort pad with three portions, all three portions are attached with the first portion resting along a pivot point from the second and third portion. The second and third portion with a triangular groove to rest over a rubber protective piece on a car window. The second portion on top of the first portion while the window is in a down position since the second and third portion can rotate in a counter clockwise direction along the pivot point. In contrast, the first, second and third portion to rest on an interior side of a car door while the window is in an up position. A felt like material on an exterior side of a plastic support for the pad to protect the car window.

1 Claim, 8 Drawing Sheets

APPARATUS FOR INTERIOR AUTO COMFORT PADS

FIELD

The present invention relates to interior auto comfort pads and more particularly pertains to attaching to any predetermined location within a vehicle to provide support and/or comfort.

DESCRIPTION OF THE PRIOR ART

The use of armrests and comfort pads are known in the prior art. More specifically, armrests heretofore devised and utilized for the purpose of supporting an arm are known to consist basically of familiar, expected and obvious structural configurations, notwithstanding the myriad of designs encompassed by the crowded prior art which have been developed for the fulfillment of countless objectives and requirements. Likewise, comfort pads may be used on door panels for the purpose of a soft interface between the door and the driver's leg.

While these devices fulfill their respective, particular objective and requirements, these devices do not describe a vehicle door top armrest for attaching to a car door to provide a place for comfortable placement of a driver's arm. Likewise, they fail to provide a convenient and simple design for a comfort pad. Some examples of typical armrests and comfort pads are U.S. Pat. Nos.: 5,893,601, 5,332,288, 4,982,921, 5,979,987, Design 419,130, 4,910,060, 6,093,468, 5,445,858, 5,713,544.

BRIEF DESCRIPTION OF THE FIGURES

The present invention is illustrated by way of example and not limitation in the Figures of the accompanying drawings.

DETAILED DESCRIPTION

The following description provides an apparatus for interior auto comfort pads. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement the claimed subject matter without undue experimentation.

As previously described, various problem exist for auto comfort pads and amrests. In contrast, in one aspect, the claimed subject matter teaches an auto comfort pad to be utilized in various applications, such as, pad for a center console in a vehicle, armrest, and leg pad for a side door.

Figure 1:
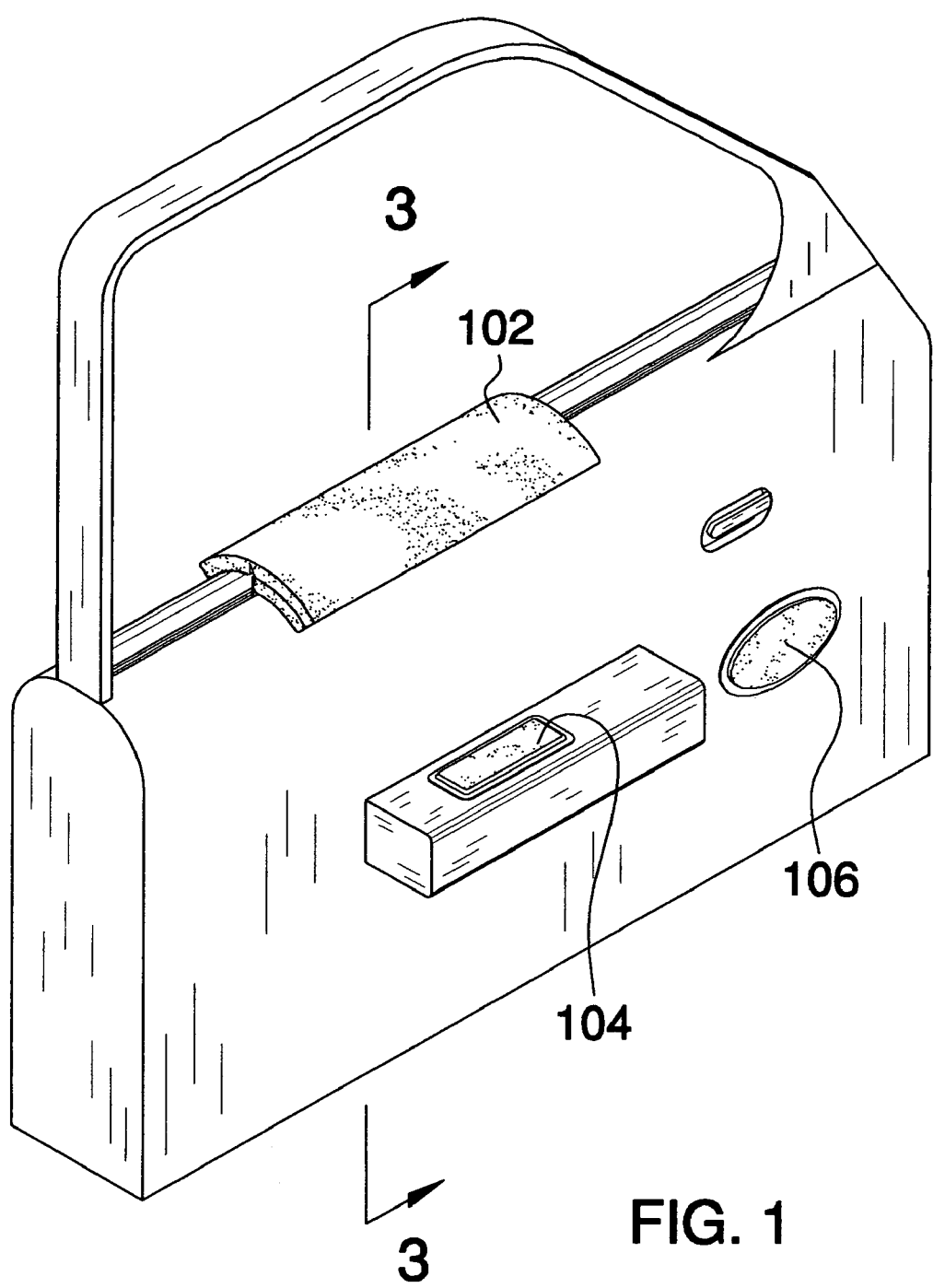
FIG. 1 illustrates a general perspective view of an use of an apparatus utilized in accordance with multiple embodiments while a window is in an down position.

FIG. 1 illustrates a general perspective view of an use of an apparatus utilized in accordance with multiple embodiments. For example, arm pad 102 rests on a window, while the window is in a down position. The armrest comprises a soft textile surface and a pad separated by a fold line. The armrest will also remain on the window while the window is in an up position, which will be discussed further in connection with FIG. 3. The remaining auto comfort pads 104 and 106 may be used on an armrest or act as a leg pad to serve as an interface between the door and the driver or passenger's leg/kneecap.

Figure 2:
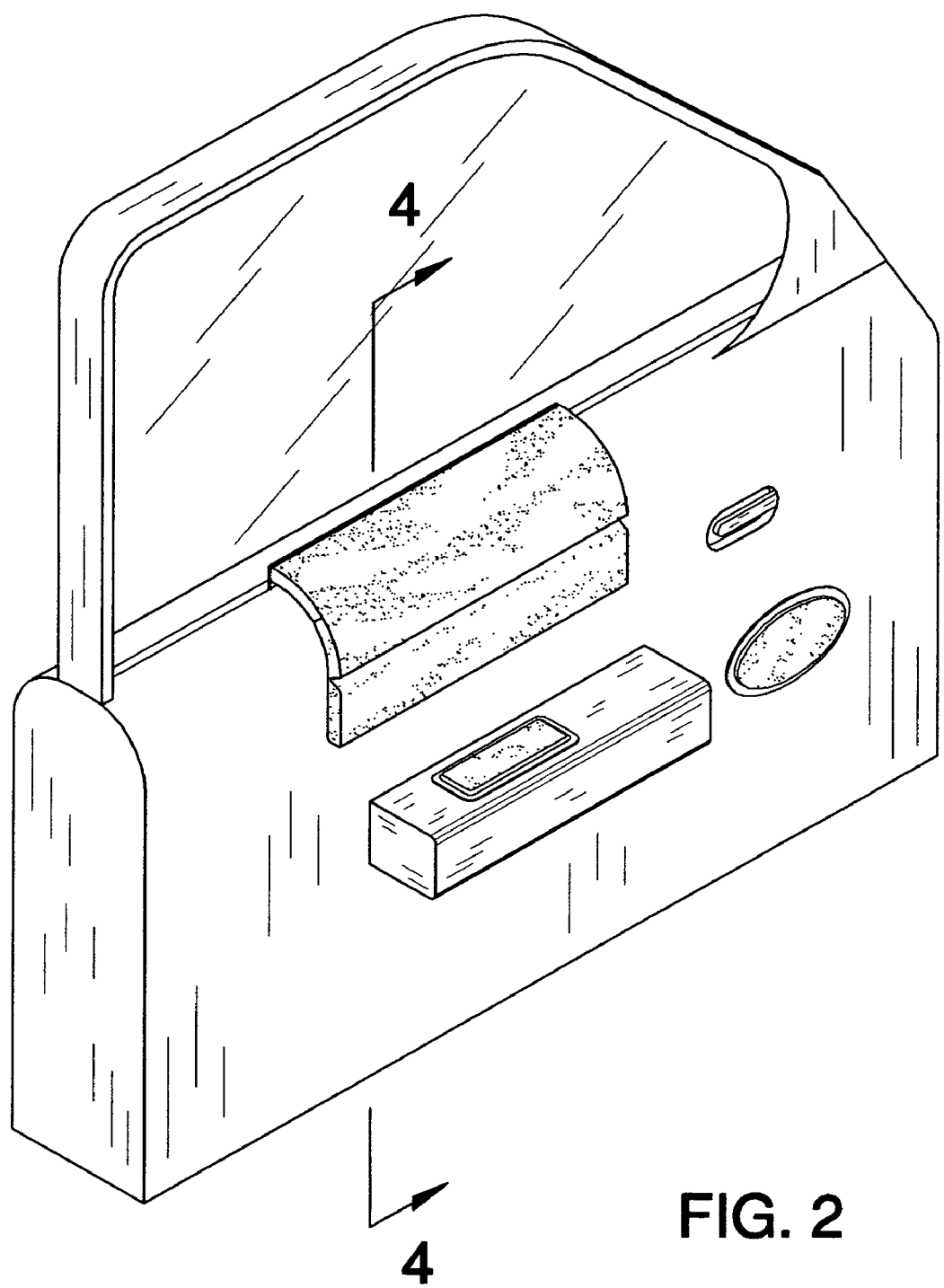
FIG. 2 illustrates a general perspective view of an use of an apparatus utilized in accordance with multiple embodiments while a window is in an up position.

FIG. 2 illustrates a general perspective view of an use of an apparatus utilized in accordance with multiple embodiments while a window is in an up position. The arm pad has a pivot point that will be discussed in further detail in connection with FIGS. 3b and 4.

Figure 3A:
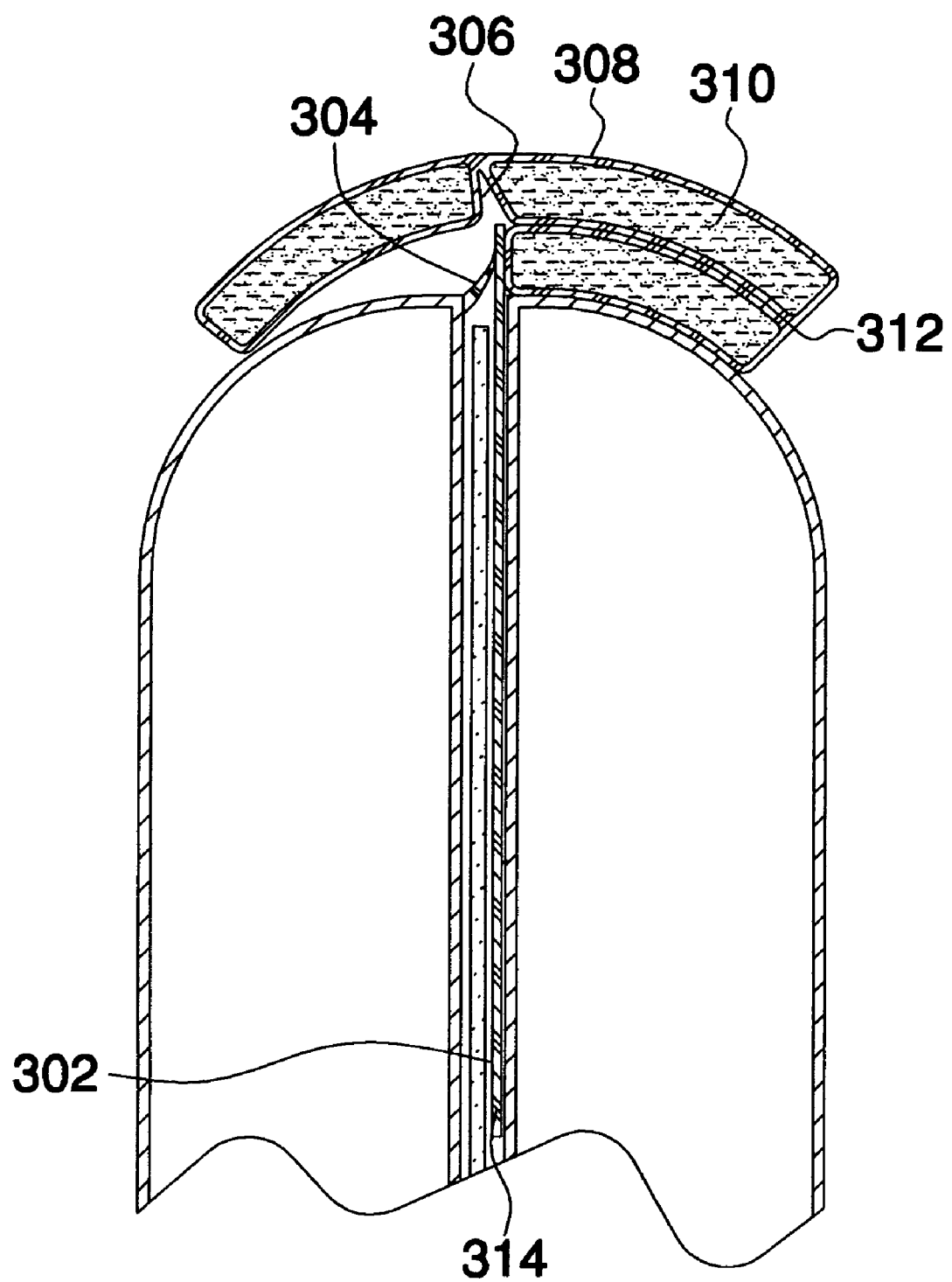
FIG. 3a illustrates a side cross sectional view of an use of an apparatus utilized in accordance with one embodiment of an arm rest in a window down position.

FIG. 3A illustrates a side cross sectional view of a use of an apparatus utilized in accordance with one embodiment of an arm rest in a window down position. FIG. 3A depicts the view of the auto comfort pad when the window is an down position.

Figure 3B:
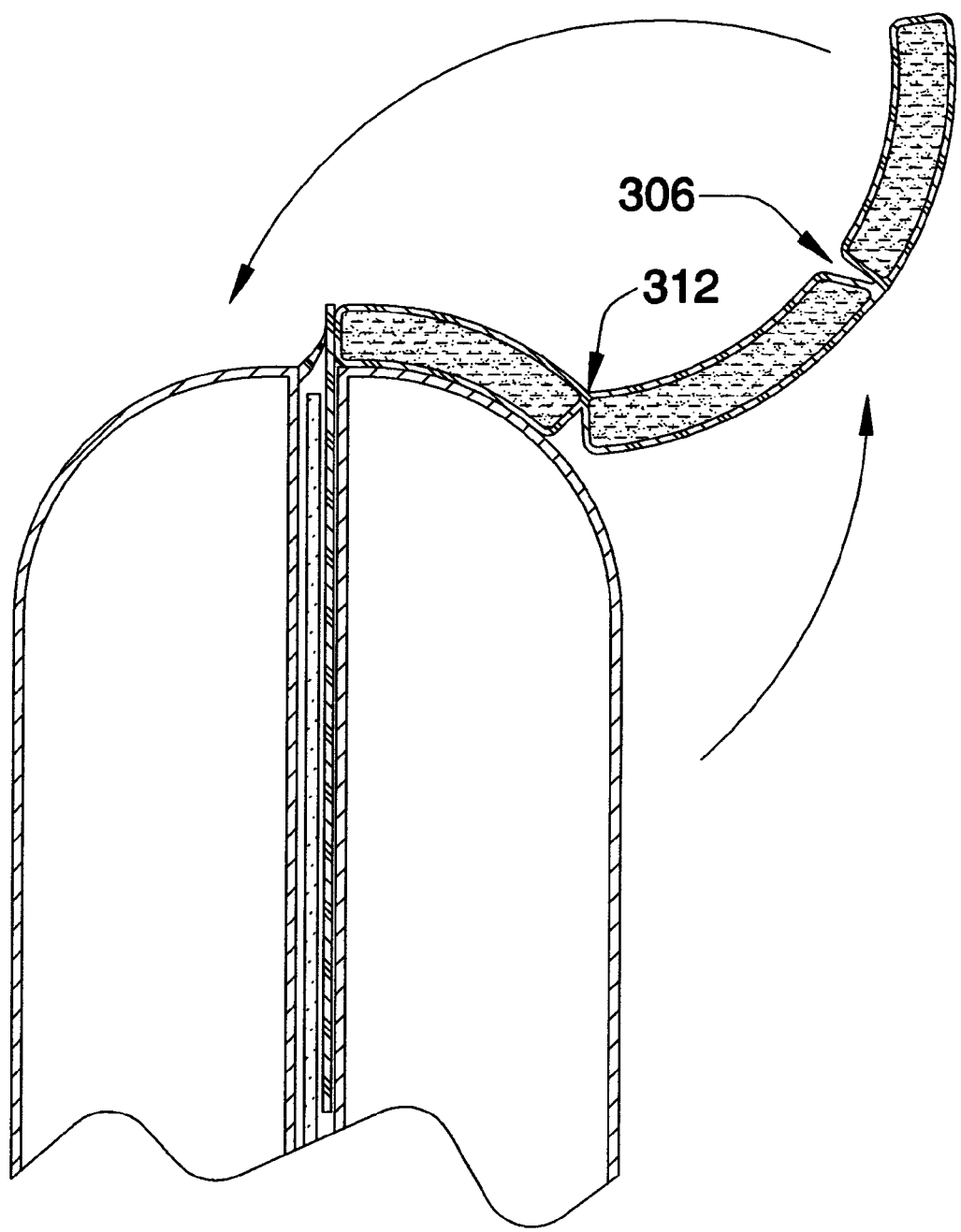
FIG. 3b illustrates a view of the apparatus as it pivots along the pivot point.

A felt material 302 will protect the window while it is in a down position and a plastic support 314 for the arm pads is illustrated in more detail in connection with FIG. 5. A groove 306 rests over the window and a rubber protective piece 304 that is typically used on car windows rests below the groove 306. As discussed earlier, the pads have an outer covering 308 with a gel like material 310 for a filling FIG. 3b illustrates a view of the apparatus as it pivots along the pivot point. This view depicts the ability of the auto pad to pivot along the pivot point 312 when the window transitions from an up position to a down position.

Figure 4:
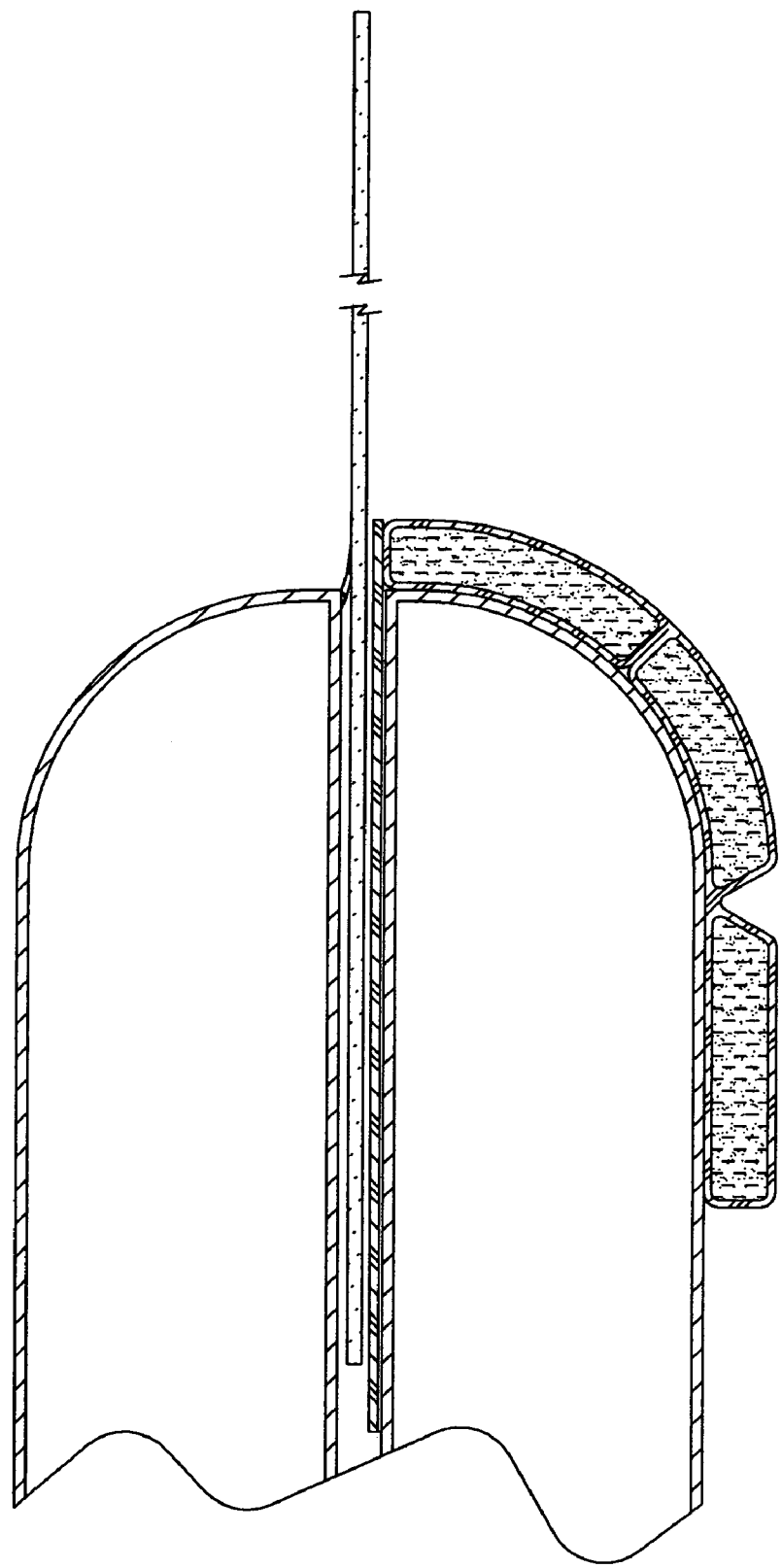
FIG. 4 illustrates a side cross sectional view of an use of an apparatus utilized in accordance with one embodiment of an arm rest in a window up position.

FIG. 4 illustrates a side cross sectional view of an use of an apparatus utilized in accordance with one embodiment of an arm rest in a window up position. In contrast to FIG. 3a, the window is in an up position and the auto pad is resting along the interior side of the door.

Figure 5:
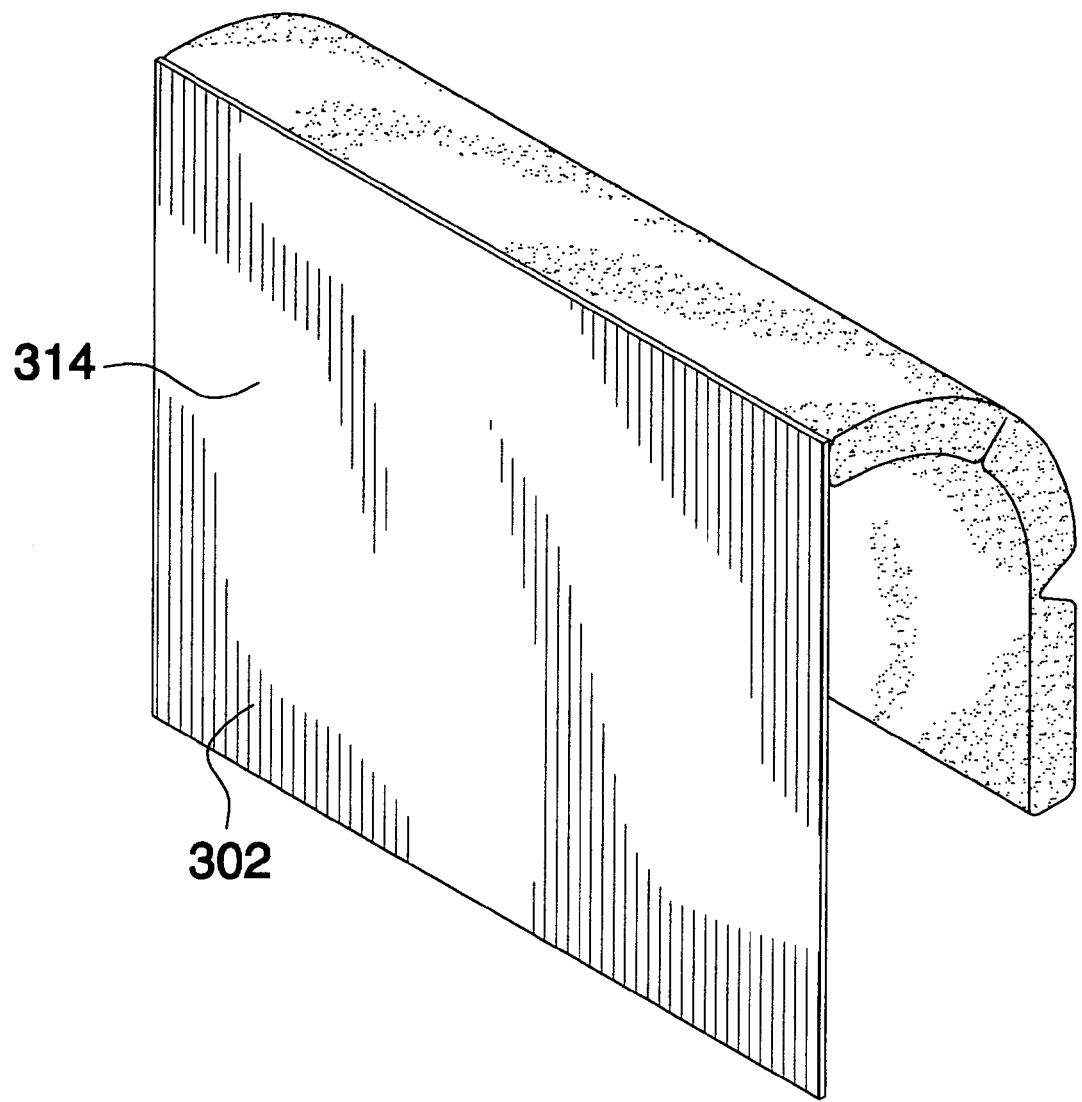
FIG. 5 illustrates a side cross sectional view of an use of an apparatus utilized in accordance with one embodiment.

FIG. 5 illustrates a side cross sectional view of an use of an apparatus utilized in accordance with one embodiment. This view depicts the apparatus in an isolated position to clearly detail the plastic support 314 and felt like material 302 that were discussed earlier.

Figure 6A:
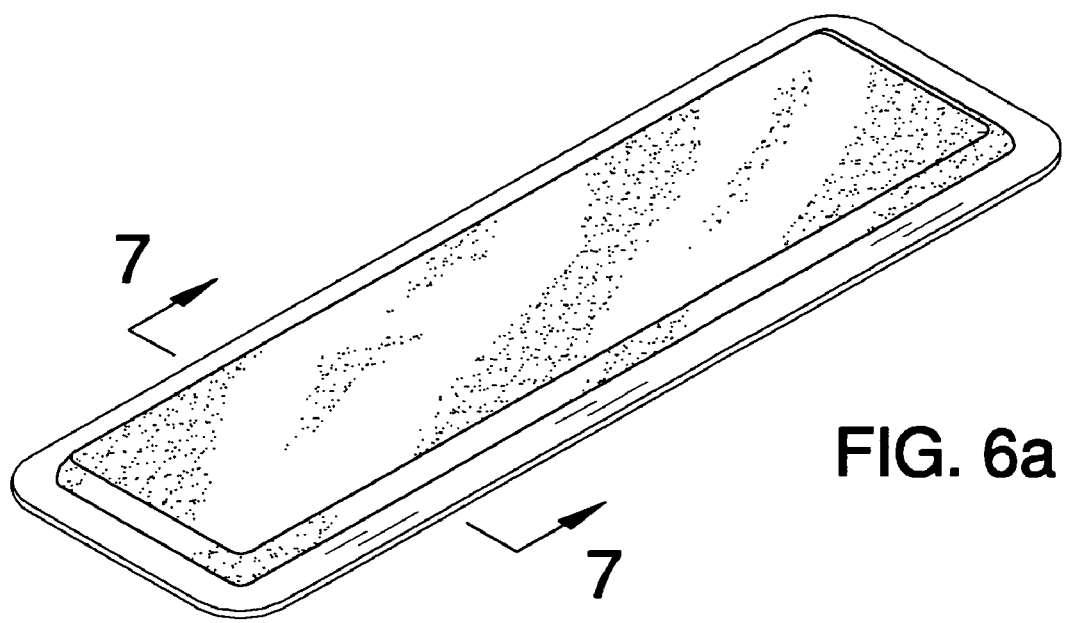
FIGS. 6a, b, and c illustrate multiple embodiments of different pad configurations.

FIGS. 6a, b, and c illustrate multiple embodiments of different pad configurations.

Figure 6B:
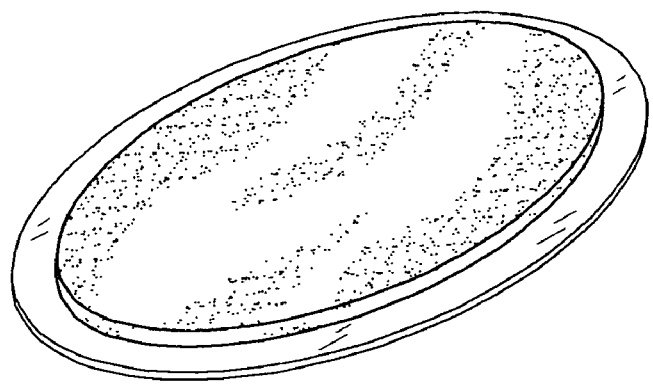
Figure 6C:
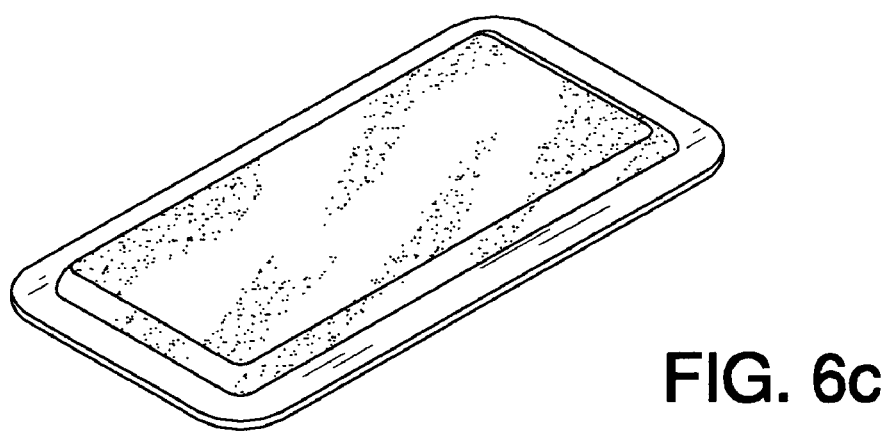

For example, FIG. 6a is a long rectangular shape, 6b is an oval shape and 6c is a shorter rectangular shape. In one embodiment, FIGS. 6a and 6c may be used on an armrest and FIG. 6b has a knee pad.

Figure 7:
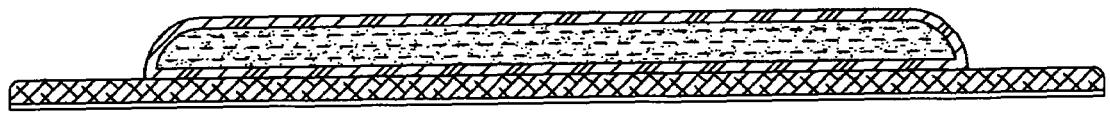
FIG. 7 illustrates a cross sectional view of an pad.

FIG. 7 illustrates a cross sectional view of an pad.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An auto comfort pad for attaching to a vehicle door comprising:

a pad with an outer covering exterior and a gel like material for filling within a cavity of the pad;

the pad having a first, a second and a third portion, all three portions being attached with the first and second portions being attached along a pivot point, the second and third portion having a triangular groove formed there between to rest over a rubber protective piece being for a vehicle window and the second portion being on top of the first portion while the window is in a down position since the second and third portion can rotate in a counter clockwise direction along the pivot point;

the first, second and third portion to rest on an interior side of a vehicle door while the window is in an up position;

a plastic support attached to the first portion and extending into the vehicle door along the door window, the support having a felt like material on an exterior facing side of the support for protecting the vehicle window.

* * * * *